US010235652B2

(12) United States Patent
Varrasso (10) Patent No.: US 10,235,652 B2
(45) Date of Patent: Mar. 19, 2019

(54) INVENTORY CONTROL SYSTEM (71) Applicant: Sonia Varrasso, Gibsonia, PA (US)

(72) Inventor: Sonia Varrasso, Gibsonia, PA (US)

(*) Notice: Subject to any disclaimer, the term of this patent is extended or adjusted under 35 U.S.C. 154(b) by 893 days.

(21) Appl. No.: 14/497,283

(22) Filed: Sep. 25, 2014

(65) Prior Publication Data
US 2015/0088675 A1 Mar. 26, 2015

Related U.S. Application Data (60) Provisional application No. 61/883,038, filed on Sep. 26, 2013.

(51) Int. Cl.
| G06Q 10/08 | (2012.01) |
| G07F 11/00 | (2006.01) |
| G07F 9/10 | (2006.01) |
| G06Q 20/20 | (2012.01) |
| G07F 5/18 | (2006.01) |
| G06F 17/00 | (2006.01) |

(52) U.S. Cl.
CPC ......... *G06Q 10/087* (2013.01); *G06Q 20/203* (2013.01); *G06Q 20/206* (2013.01); *G07F 5/18* (2013.01); *G07F 9/105* (2013.01); *G07F 11/002* (2013.01); *F25D 2700/06* (2013.01)

(58) Field of Classification Search
USPC ........................................................ 705/18
See application file for complete search history.

(56) References Cited

U.S. PATENT DOCUMENTS

| 8,095,435 B2 * | 1/2012 | Newton ................. G06K 17/00 705/22 |
| 9,454,868 B2 * | 9/2016 | Hirshbain ............. G07F 11/165 |
| 9,524,368 B2 * | 12/2016 | Kuehnrich ............ G06F 17/602 |
| 2004/0225409 A1 | 11/2004 | Duncan et al. |
| 2005/0182513 A1 | 8/2005 | Ponsi et al. |
| 2006/0259190 A1 * | 11/2006 | Hale ................. G06Q 10/06311 700/234 |
| 2009/0172035 A1 * | 7/2009 | Lessing ............. G06F 17/30595 |
| 2010/0010666 A1 | 1/2010 | Adams |
| 2010/0017023 A1 * | 1/2010 | Jacomet .................. G07F 9/026 700/236 |

FOREIGN PATENT DOCUMENTS

| JP | 3712114 | 11/2005 |
| JP | 2010-233864 | 10/2010 |
| KR | 10-2009-0068784 | 6/2009 |
| KR | 10-2010-0003343 | 1/2010 |

OTHER PUBLICATIONS

International Search Report and Written Opinion of the International Searching Authority (for PCT application No. PCTIB2014064881 which has claims that have some elements which are similar to the current application).

* cited by examiner

*Primary Examiner* — Garcia Ade
(74) *Attorney, Agent, or Firm* — Dodd Call Black, PLLC; Dustin Call (57) ABSTRACT

An inventory control system. The inventory control system includes a terminal, wherein the terminal is configured to allow a user to enter a sale of an item. The inventory control system also includes a cabinet. The cabinet is configured to store the item and is in electronic communication with the terminal. The cabinet dispenses the item in response to the sale.

20 Claims, 6 Drawing Sheets

INVENTORY CONTROL SYSTEM

CROSS-REFERENCE TO RELATED APPLICATIONS

This application claims the benefit of and priority to U.S. Provisional Patent Application Ser. No. 61/883,038 filed on Sep. 26, 2014, which application is incorporated herein by reference in its entirety.

This application is related to co-pending U.S. patent application Ser. No. 14/497,284, filed on Sep. 25, 2014, and entitled, "INVENTORY MONITORING SYSTEM", which application is incorporated herein by reference in its entirety.

BACKGROUND OF THE INVENTION

Control of inventory within the service industry is a continual problem. In particular, a lot of item can be moved very quickly and transactions are difficult to monitor. This presents many situations where employees can lose track of items or where employees can steal items or gift them without any ability of owners or manager to identify sources of loss unless they happen to view the theft.

In addition, inventory in particular locations is hard to keep track of. Generally, in locations such as sports arenas where multiple sales locations are spread throughout a venue, the inventory at each location must be checked manually. This means that either an authorized employee must continually be checking inventory and restocking where needed or employees must be counted on to accurately report inventory, once again opening the system up to potential fraud.

Accordingly, there is a need in the art for a system that can automatically control inventory. Further, there is a need in the art for the system to monitor removal of items by each employee to increase employee accountability. Moreover, there is a need for the system to provide relevant reports that allow for better control of ordering and to maximize profitability.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes an inventory control system. The inventory control system includes a terminal, wherein the terminal is configured to allow a user to enter a sale of an item. The inventory control system also includes a cabinet. The cabinet is configured to store the item and is in electronic communication with the terminal. The cabinet dispenses the item in response to the sale.

Another example embodiment includes an inventory control system. The inventory control system includes a terminal, wherein the terminal is configured to allow a user to enter a sale of an item. The inventory control system also includes a cabinet. The cabinet is configured to store the item and is in electronic communication with the terminal. The cabinet dispenses the item in response to the sale. The inventory control system further includes a point of sale sever. The point of sale server is in electronic communication with the terminal and the cabinet and is configured to manage the operation of the inventory control system including managing inventory within the cabinet.

Another example embodiment includes a method of controlling inventory using an inventory control system. The method includes producing an inventory list which identifies items within a cabinet and completing a sale of an item at a terminal. The method also includes releasing the item from the cabinet and updating the inventory list to reflect the sale of the item.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
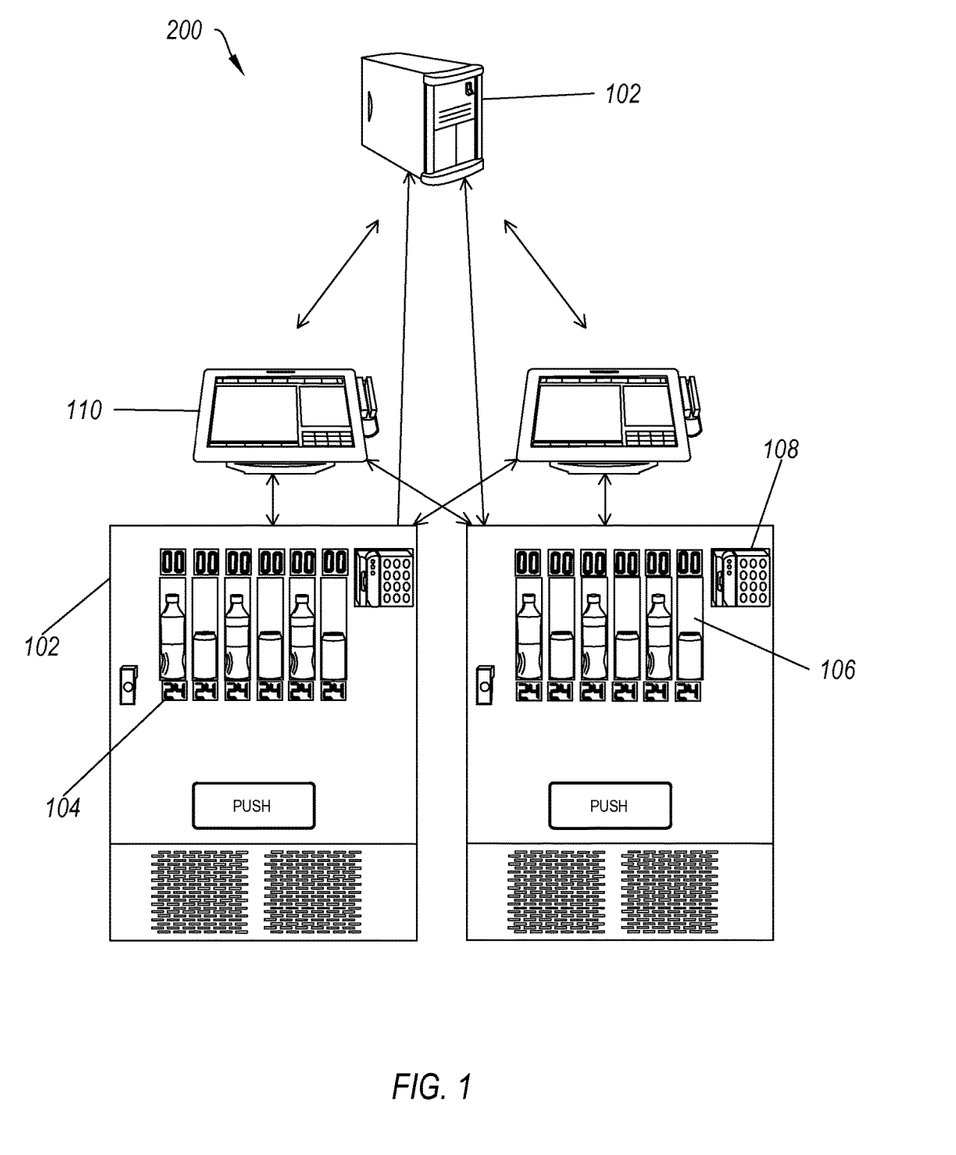
FIG. 1 illustrates an example of an inventory control system.

FIG. 1 illustrates an example of an inventory control system 100. The inventory control system 100 can ensure that any items removed are properly accounted for before they are removed and provided to customers. I.e., it does not require an "honor system" where employees can remove items as desired but instead requires an employee to enter a sale or transaction before a piece of inventory can be removed. The inventory control system 100 can assist small businesses, corporate chains, hotels, stadium and concert venues or any other entity which needs to control inventory.

FIG. 1 shows that the inventory control system 100 can include a cabinet 102. The cabinet 102 can be configured to store the desired items. For example, the cabinet 102 can store bottles, cans, foods, toiletries or any other desired item. The cabinet 102 can dispense the stored items in response to a sale, as described below. I.e., the cabinet 102 can store and dispense the loaded items. The cabinet 102 can be sold separately with other parts sold as an add-on kit that allows the cabinet 102 to be converted to an inventory control system 100. I.e., the cabinet 102 can be separate from other parts (e.g., purchased as a cooler) and the other parts (described below) can be used to convert the stand along cabinet 102 to an inventory control system. As used in the specification and the claims, the phrase "configured to" denotes an actual state of configuration that fundamentally ties recited elements to the physical characteristics of the recited structure. As a result, the phrase "configured to" reaches well beyond merely describing functional language or intended use since the phrase actively recites an actual state of configuration.

The cabinet 102 can include any desired hardware for implementing the inventory control system 100 functions. For example, the cabinet 102 can include built in computing systems. Likewise, the cabinet 102 can include any desired software for implementing the inventory control system functions. For example, the cabinet 102 can include MICROS, FUTURE, ALOHA or any other desired software.

FIG. 1 also shows that the cabinet 102 can include a display 104. The display 104 can indicate the items available within the cabinet 102. For example, the display 104 can include individual item counts, which shows the current inventory of each item. Additionally or alternatively, the display 104 can include a single display which shows inventory as a whole within the cabinet 102.

FIG. 1 further shows that the cabinet 102 can include one or more windows 106. The windows 106 can allow a user to visually inspect inventory or otherwise determine the presence of items within the cabinet 102. I.e., the windows 106 can allow the user to view items within the cabinet 102. The cabinet 102 can include lighting or other elements which allow for inspection through the window 106.

FIG. 1 additionally shows that the inventory control system 100 can include a keypad 108 on the cabinet 102. The keypad 108 can be used to complete a transaction, enter sale information (for example, via a card reader), unlock the cabinet 102 for restocking or otherwise control the operation of cabinet 102, as described below. For example, a user can enter a code which releases a particular item in response to a sale, as described below. The code can include any desired code, such as an employee number, transaction id number or sale id number.

FIG. 1 moreover shows that the inventory control system 100 can include a terminal 110. A terminal 110 is the place where a retail transaction is completed. I.e., the terminal 110 is the point at which a customer makes a payment to the merchant in exchange for goods or services or where the retailer can calculate the amount owed by the customer, enter the customers payment amount and type, issue a receipt for the transaction, close sales for a shift or day or complete any other desired transaction.

The terminal 110 in various retail industries can use customized hardware and software as per their requirements. For example, retailers may utilize weighing scales, scanners, electronic and manual cash registers, electronic payment terminals (such as credit card readers), touch screen or other graphical user interfaces and any other of a wide variety of hardware and software available for use with the terminal 110. E.g., a grocery or candy store may use a scale at the terminal 110, while bars and restaurants use software to customize the item or service sold when a customer has a special meal or drink request.

One of skill in the art will appreciate that any desired software can be used at the terminal 110. For example, the terminal 110 can used standardized software such as OPOS and JavaPOS, both of which conform to the UnifiedPOS standard led by The National Retail Foundation. OPOS (OLE for POS) was the first commonly adopted standard and was created by Microsoft, NCR Corporation, Epson and Fujitsu-ICL. OPOS is a COM-based interface compatible with all COM-enabled programming languages for Microsoft Windows. OPOS was first released in 1996. JavaPOS was developed by Sun Microsystems, IBM, and NCR Corporation in 1997 and first released in 1999. JavaPOS is for Java what OPOS is for Windows, and thus largely platform independent. Other protocols which can be used at the terminal 110 include: Logic Controls; Epson Esc/POS; UTC Standard; UTC Enhanced; AEDEX; ICD 2002; Ultimate; CD 5220; DSP-800; ADM 787/788; HP or any other desired software.

FIG. 1 also shows that the inventory control system 100 can include a point of sale (POS) server 112. The POS server 112 can include software or other instructions which control the operation of the cabinet 102 and the terminal 110. For example, the POS server 112 can include any desired computing system, such as a server, computer, laptop, tablet, smart phone, netbook or any other desired computing system. The POS server 112 can monitor which cabinet 102 will dispense items (e.g., if the POS server 112 determines that an item is present in one cabinet 102 but not in another cabinet 102, the POS server 112 can direct the user to the first cabinet 102). Additionally or alternatively, the POS server 112 can make available reports, such as sale and inventory numbers, for the totality of terminals 110 and cabinets 102 as described below.

Additionally or alternatively, the POS server 112 can manage all sales. For example, the POS server 112 can handle credit card transactions or other sales data by communicating with an outside payment service, such as a bank or merchant services account. In addition, when a user logs onto a terminal 110 or cabinet 102 the POS server 112 can confirm the access and dispense the desired items from the cabinet 102. I.e., the POS server 112 can ensure that each transaction is authorized and that the proper items are provided to customers.

The POS server 112 can allow allows input by owner, manager, or corporate officers of all inventory ordered for each venue. I.e., if an item is purchased, the total number of items is added to the current number of the item and then counts down from the total, as well as the number in each cabinet, as the item is sold. For example, a price look up (PLU) number can be assigned to each item in the cabinet 102 and the same number will be assigned to the same items on the POS server 112 and at the terminal 110.

Additionally or alternatively, the POS server 112 can generate desired reports for management of inventory. For example, the POS server 112 can send notification messages on inventory ordering or ordering alerts when an item runs low at each cabinet 102 or overall, allows reports to be generated for each item sold detailing the item success by each employee or at each venue, allow input for reports to be generated as to cost of item, price per item, profit margin for each item or any other desired report. The messages and/or reports can be sent via email, text message, alarms at the cabinet 102, the terminal 110 or the POS server 112 or through any other desired method.

One of skill in the art will understand that the cabinet 102, the terminal 110 and the POS server 112 can be in electronic communication with one another. This can allow a sale entered at the terminal 110 to result in the release of inventory at the cabinet 102. For example, if the sale of a drink is entered at the terminal 110, the retailer can enter the desired drink and complete the sale. The POS server 112 can confirm the payment information from the customer. The drink is then released at the cabinet 102 where the retailer collects the drink to take to the customer and the POS server 112 updates the inventory list to reflect the sale of the item.

The electronic communication can occur via any desired mechanism. For example, the electronic communication can take place over a network. The network exemplarily includes the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network includes one or more cellular RF networks and/or one or more wired and/or wireless networks such as, but not limited to, 802.xx networks, Bluetooth access points, wireless access points, IP-based networks, cellular networks, or the like. For example, the network can include cloud based networking and computing. The network can also include servers that enable one type of network to interface with another type of network.

One of skill in the art will further appreciate that one or more of the parts of the inventory control system 100 can be combined. For example, the POS server 112 can include a terminal 110 which is master to other terminals 106. Additionally or alternatively, the terminal 110 can be mounted on the cabinet 102, allowing both to be placed in a single location.

By way of example, a representative transaction using the system 100 will be described. One of skill in the art will appreciate that the order of the transaction or the portions of the system 100 used for each step of the transaction can be modified as desired. To begin the transaction a user logs on to a terminal 110. The terminal 110 has an identification of some kind. For example, the terminal 110 can be identified by integer number, such as 07. The user then selects an item at the cabinet 102. The item can be identified by position number, integer, PLU or any other desired identification. For this example, it is assumed that the user selects the item using an integer such as 04. Therefore, the user enters 0704 at the cabinet 102 to identify both the terminal 110 (07) and the item (04). The item is then dispensed from the cabinet 102 and the item and price appears on the terminal 110. The user is then responsible for ensuring that the item is paid for. The inventory is automatically updated, at the POS server 112, allowing a selected manager to keep track of total inventory and inventory at individual cabinets 102.

Figure 2:
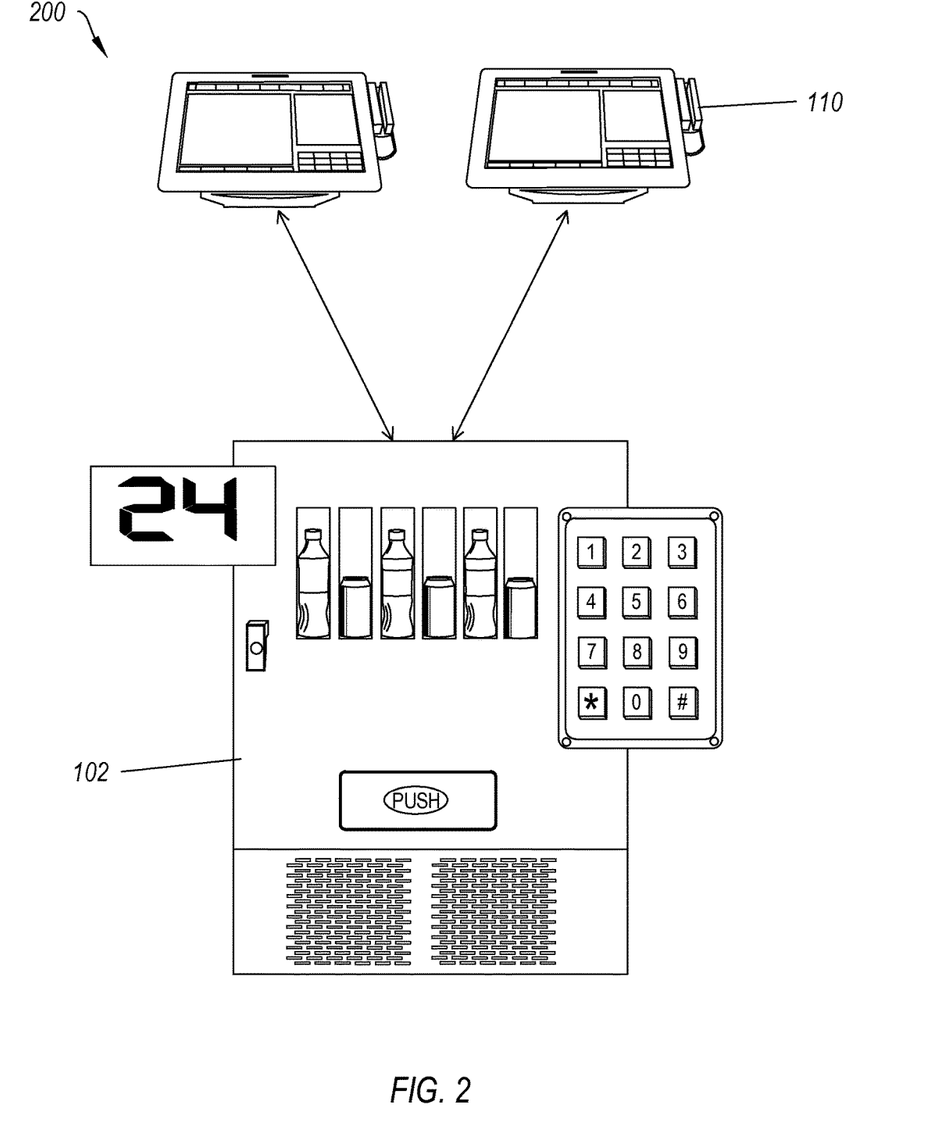
FIG. 2 illustrates an alternative example of an inventory control system.

FIG. 2 illustrates an alternative example of an inventory control system 200. The inventory control system 200 can allow users to directly enter information which completes payment at the terminal 110 and obtain items from the cabinet 102. I.e., the inventory control system 200 does not have a POS server (such as the POS server 12 of FIG. 1) and any person who so desires can make payment and retrieve inventory from the cabinet 102.

FIG. 2 shows that the inventory control system 200 can include a card reader 202. The card reader 202 can allow a user to directly enter payment information. For example, the card reader 202 can read credit card information or a hotel room key to direct payment to the appropriate persons. I.e., the inventory control system 200 can be placed in a hotel and guests can swipe a key card which dispenses items and then bills the items to the guest's hotel room. Additionally or alternatively, the user could enter information via the keypad 106 to enter payment information, such as room number, or credit card number.

By way of example, a representative transaction using the system 200 will be described. One of skill in the art will appreciate that the order of the transaction or the portions of the system 200 used for each step of the transaction can be modified as desired. To begin the transaction a guest logs on to a terminal 110. The log on can occur using any desired method, such as identification of a room number or the entry of payment information. The terminal 110 has an identification of some kind. For example, the terminal 110 can be identified by integer number, such as 07. The guest then selects an item at the cabinet 102. The item can be identified by position number, integer, PLU or any other desired identification. For this example, it is assumed that the guest selects the item using an integer such as 04. Therefore, the guest enters 0704 at the cabinet 102 to identify both the terminal 110 (07) and the item (04). The item is then dispensed from the cabinet 102 and the item and price appears on the terminal 110 where the payment is completed. The inventory can be automatically updated at an external system, such as a hotel computer, allowing a selected manager to keep track of total inventory and inventory at individual cabinets 102.

Figure 3:
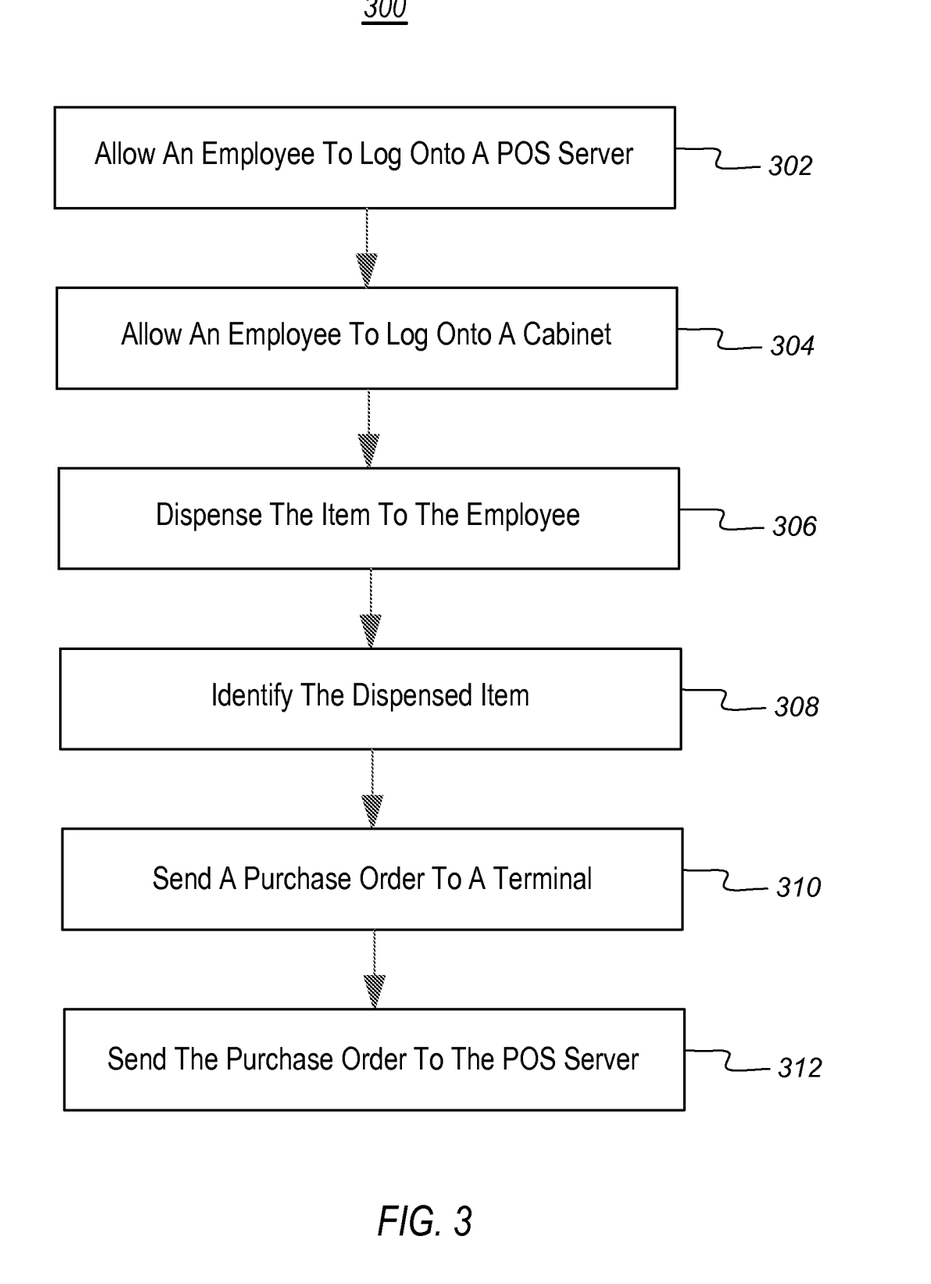
FIG. 3 is a flow chart illustrating a method of authorizing a sale and dispensing an item.

FIG. 3 is a flow chart illustrating a method 300 of authorizing a sale and dispensing an item. The method 300 can use an inventory control system, such as the inventory control system 100 of FIG. 1 or the inventory control system 200 of FIG. 2. Therefore, the method 300 will be described, exemplarily, with reference to the inventory control system 100 of FIG. 1 or the inventory control system 200 of FIG. 2. Nevertheless, one of skill in the art can appreciate that the method 300 can be used with systems other than the inventory control system 100 of FIG. 1 or the inventory control system 200 of FIG. 2.

FIG. 3 shows that the method 300 can include allowing 302 an employee to log onto a POS server. For example, the employee can be asked to enter a pin number, password or other authorization manually. Additionally or alternatively, an employee can be identified automatically. For instance, the employee can be identified using biometrics (fingerprint, retina scan, etc.), by swiping an identification card, wirelessly (by placing a contactless card or fob near a scanner) or through any other desired method. Once the employee is logged onto the POS server he/she is authorized to remove items from the cabinet and/or enter sales information at a terminal.

FIG. 3 shows that the method 300 can include allowing 304 an employee to log onto a cabinet. For example, the employee can be asked to enter a pin number, password or other authorization manually. Additionally or alternatively, an employee can be identified automatically. For instance, the employee can be identified using biometrics (fingerprint, retina scan, etc.), by swiping an identification card, wirelessly (by placing a contactless card or fob near a scanner) or through any other desired method. Once the employee is logged onto the cabinet then any items removed are added to his/her account. I.e., the items are added to a report of items removed by that employee (which can later be compared to entered sales).

FIG. 3 also shows that the method 300 can include dispensing 306 the item to the employee. The employee is then responsible for, and can be held accountable for, all items dispensed 306 under the employee's id number. I.e., the responsibility is then on the employee to ensure that payment is received for the item from the customer. The employee may serve the item to the customer before or after payment is made. Likewise, an employee can return an unsold item which is then credited to the employee and not counted as a sale.

FIG. 3 also shows that the method 300 can include identifying 308 the dispensed item. I.e., the cabinet can automatically identify 308 the item that the employee selected. For example, the cabinet can determine the space in which the item was stored and then identify 308 the dispensed item as the item that was previously located in that space or can determine that an area of the cabinet that was accessed was used to store multiple items of one type. Additionally or alternatively, the employee may have a touch screen or other graphical employee interface and select an icon for an item, can enter a PLU number, can identify the item by name, can select the item from a list or can identify 308 the item in any other desired manner.

FIG. 3 further shows that the method 300 can include sending 310 the purchase order to the terminal. I.e., once the item has been dispensed, the terminal is instructed to record the item to allow the employee to charge the customer. For example, the charge information can be required immediately from the employee or can be added to a bill to be identified by the employee or all items taken by an employee can be compared to all items charged to customers by an employee (e.g., at the end of the employee's shift).

FIG. 3 additionally shows that the method 300 can include sending 312 the purchase order to the POS server. I.e., the entirety of the transaction, including the employee identification information and the item that was purchased can be sent to the POS server by the cabinet. This can allow the POS server to compile reports and track inventory, as described above. Additionally or alternatively, the POS server can be used to complete the purchase. For example, the POS server can connect to an outside payment service in order to complete payment.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
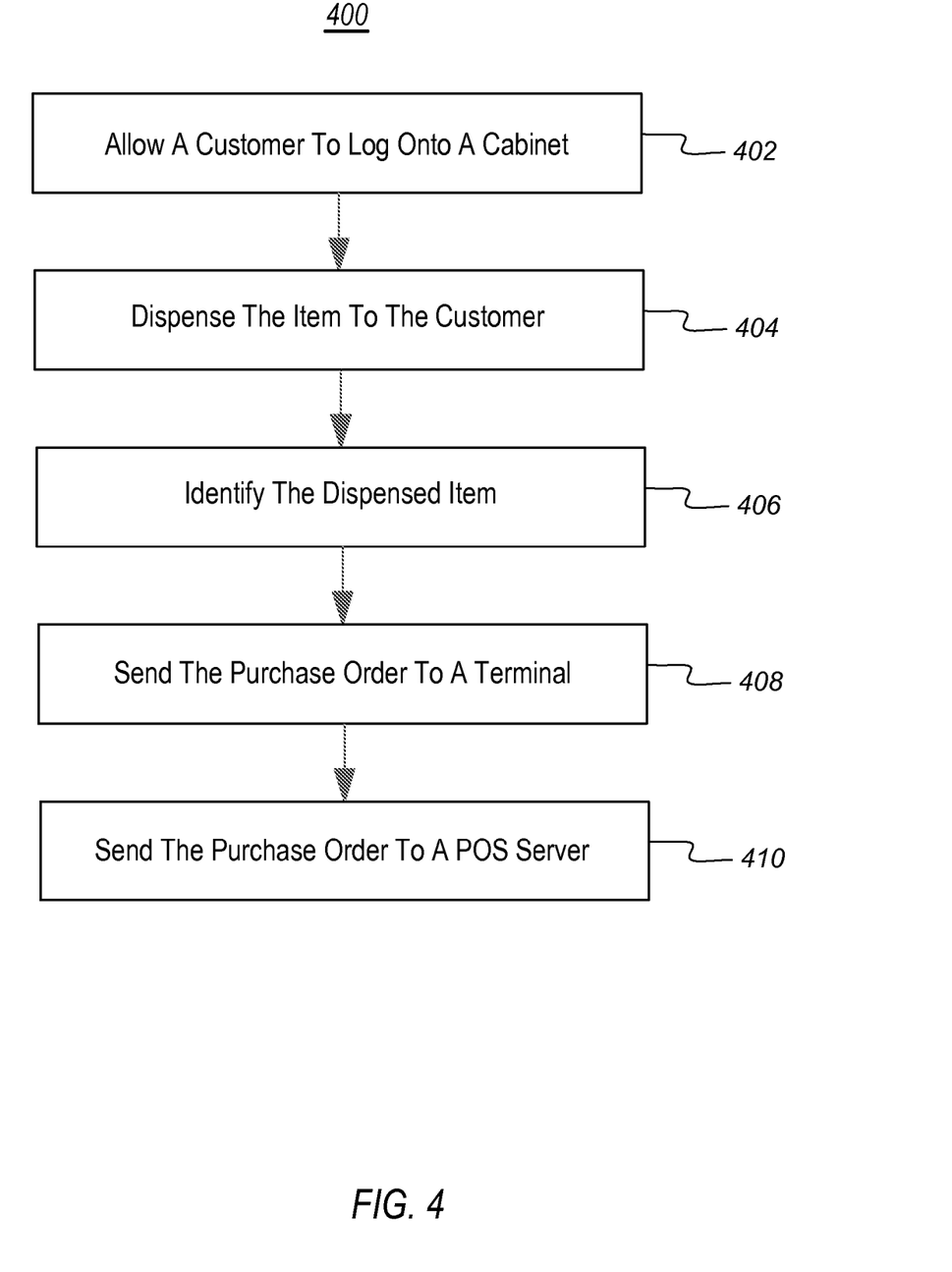
FIG. 4 is a flow chart illustrating an alternative method of authorizing a sale and dispensing an item.

FIG. 4 is a flow chart illustrating an alternative method 400 of authorizing a sale and dispensing an item. The method 400 can use an inventory control system, such as the inventory control system 100 of FIG. 1 or the inventory control system 200 of FIG. 2. Therefore, the method 400 will be described, exemplarily, with reference to the inventory control system 100 of FIG. 1 or the inventory control system 200 of FIG. 2. Nevertheless, one of skill in the art can appreciate that the method 400 can be used with systems other than the inventory control system 100 of FIG. 1 or the inventory control system 200 of FIG. 2.

FIG. 4 shows that the method 400 can include allowing 402 a customer to log onto a cabinet. For example, the customer can be asked to enter a pin number, password or other authorization manually. Additionally or alternatively, a customer can be identified automatically. For instance, the customer can be identified using biometrics (fingerprint, retina scan, etc.), by swiping an identification card, wirelessly (by placing a contactless card or fob near a scanner) or through any other desired method. Allowing 402 a customer to log onto a cabinet can include verifying the age or identity of the customer. For example, the customer may have to have id that will allow his/her age to be verified electronically or an employee may need to confirm age and enter authorization.

FIG. 4 also shows that the method 400 can include dispensing 404 the item to the customer. The customer is then responsible for, and can be held accountable for, all items dispensed 404 under the customer's id number. I.e., the responsibility is then on the customer to ensure that payment is received for the item from the customer. The customer may serve the item to the customer before or after payment is made.

FIG. 4 also shows that the method 400 can include identifying 406 the dispensed item. I.e., the cabinet can automatically identify 406 the item that the customer selected. For example, the cabinet can determine the space in which the item was stored and then identify 406 the dispensed item as the item that was previously located in that space or can determine that an area of the cabinet that was accessed was used to store multiple items of one type. Additionally or alternatively, the customer may have a touch screen or other graphical customer interface and select an icon for an item, can enter a PLU number, can identify the item by name, can select the item from a list or can identify 406 the item in any other desired manner.

FIG. 4 further shows that the method 400 can include sending 408 the purchase order to the terminal. I.e., once the item has been dispensed, the terminal is instructed to record the item to allow the customer to charge the customer. For example, the charge information can be required immediately from the customer or can be added to a bill to be identified by the customer or all items taken by a customer can be compared to all items charged to customers by a customer (e.g., at the end of the customer's shift).

FIG. 4 additionally shows that the method 400 can include sending 410 the purchase order to the POS server. I.e., the entirety of the transaction, including the customer identification information and the item that was purchased can be sent to the POS server by the cabinet. This can allow the POS server to compile reports and track inventory, as described above. Additionally or alternatively, the POS server can be used to complete the purchase. For example, the POS server can connect to an outside payment service in order to complete payment.

Figure 5:
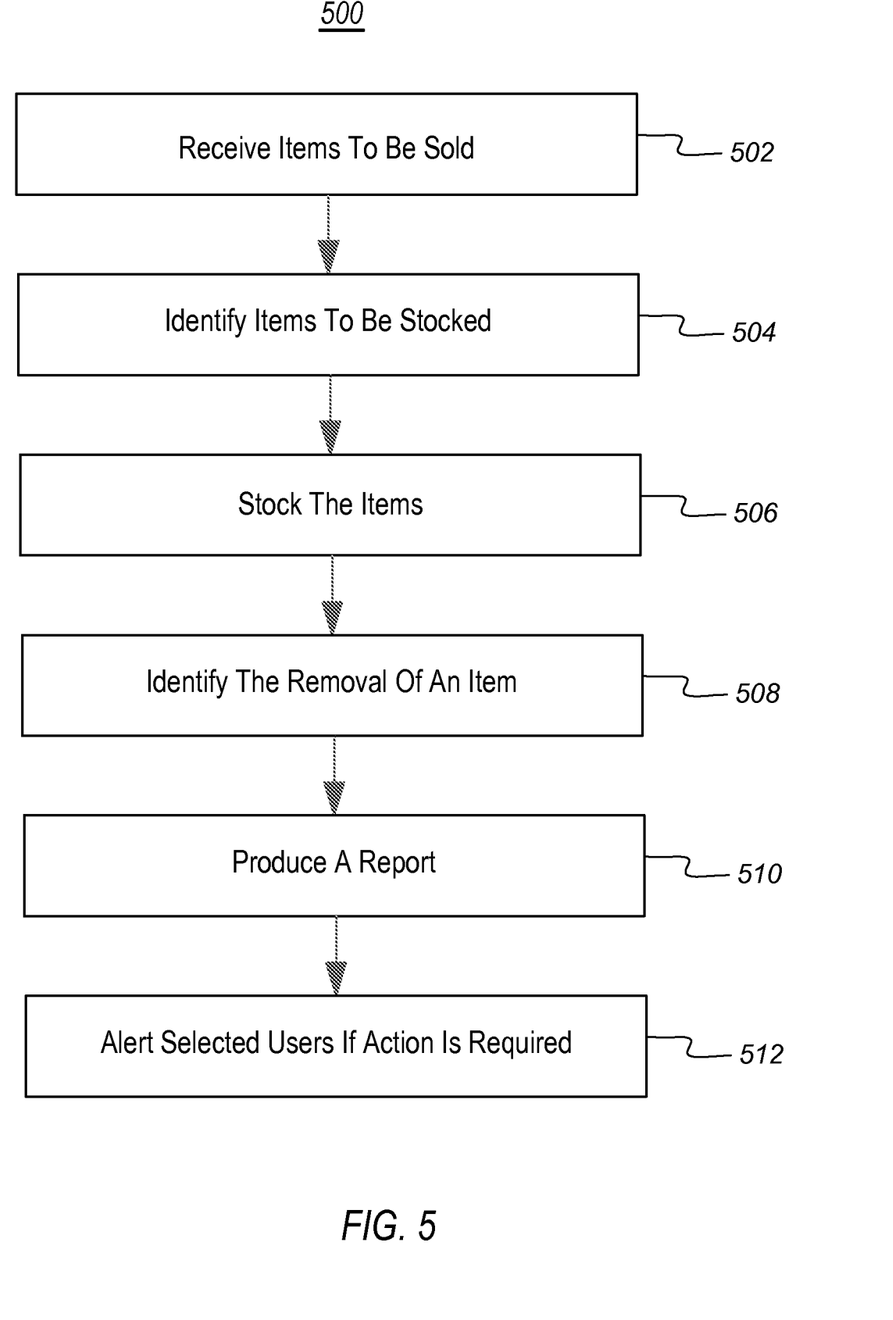
FIG. 5 is a flowchart illustrating a method of controlling inventory using an inventory control system.

FIG. 5 is a flowchart illustrating a method 500 of controlling inventory using an inventory control system. The method 500 can be implemented by a POS server or terminal. I.e., the method 500 can allow a portion of the inventory control system to keep track of inventory and notifying selected users if an item needs to be restocked or some other action is required.

FIG. 5 shows that the method 500 can include receiving 502 item to be sold. The item can be received in a business's usual method. I.e., an employee, such as a manager, can be authorized to check the incoming item and confirm that it is in response to an order or business needs. For example, the item can be received from a wholesale, distributer or retailer.

FIG. 5 also shows that the method 500 can include identifying 504 the item to be stocked. I.e., the authorized user can enter into the system the item which will be stocked in the inventory control system. For example, the user can scan a bar code on the item to automatically enter the item information, the user may have a touch screen or other graphical user interface and select an icon for an item, can enter a PLU number, can identify the item by name, can select the item from a list or can identify 504 the item in any other desired manner. The item is then added to an inventory list which shows all items and the location of the item, if necessary.

FIG. 5 further shows that the method 500 can include stocking 506 the item. The inventory can be stocked 506 at any desired location. For example, the inventory can be stocked 506 in a cabinet, vending machine or other machine that can dispense the items when purchased, as described above. The item is then updated on the inventory list as being located at that particular location.

FIG. 5 additionally shows that the method 500 can include identifying 508 the removal of an item. I.e., as each item is sold, either via an employee or directly to the customer, the item is identified and the inventory list is updated. I.e., the number of total item is decremented and the number of item at the location from which it is removed is decremented.

FIG. 5 moreover shows that the method 500 can include producing 510 a report. The report can include any desired information. For example, the report can include the total of a particular item, the total of all items, the location of items, total sales, rate of sale, profitability of items, sales by employee, sale by customer or any other report which can help increase sales or anticipate needs.

FIG. 5 also shows that the method 500 can include alerting 512 selected users if action is required. The alert 512 can include any desired method of contacting selected personnel if an action is required. For example, the contact method can include email, Twitter, text messages or any other method of contact. Additionally or alternatively, the alert 512 can include an audio or visual signal. For example, the alert 512 can include a pop-up message, an audio alarm, flashing lights or any other desired signal. One of skill in the art will appreciate that multiple alerts may be used, if desired.

The alert 512 can be in response to any predetermined situation. For example, the alert 512 can include information about the operation of the inventory control system. E.g., if a terminal or cabinet loses functionality, a user can be alerted 512 to check the functionality. Additionally or alternatively, if the number of items drops below a threshold amount, either based on actual items or based on time remaining in light of the rate of distribution, a user can be alerted 512 that additional items should be stocked.

Figure 6:
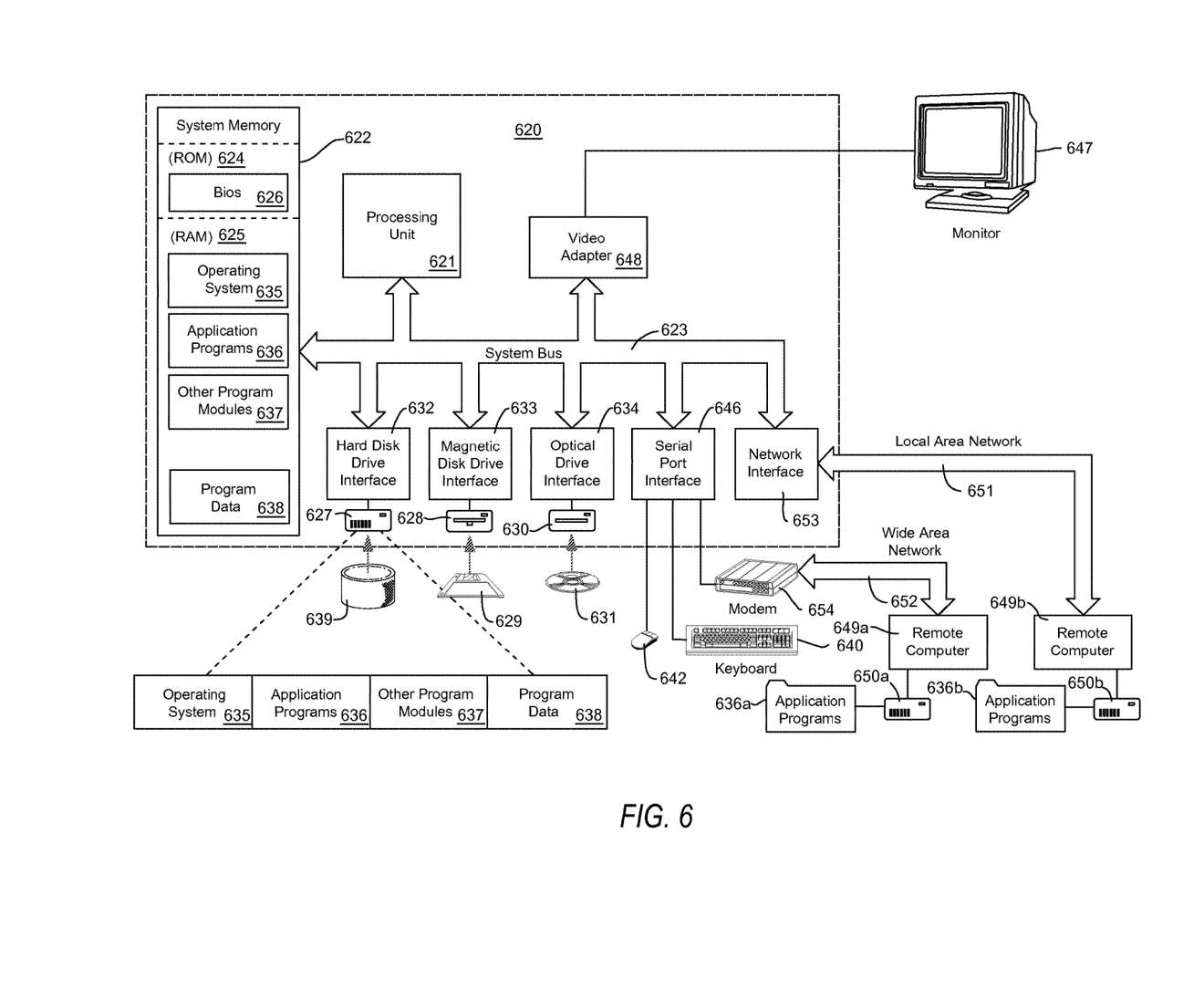
FIG. 6 illustrates an example of a suitable computing environment in which the invention may be implemented.

FIG. 6, and the following discussion, is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

One of skill in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an example system for implementing the invention includes a general purpose computing device in the form of a conventional computer 620, including a processing unit 621, a system memory 622, and a system bus 623 that couples various system components including the system memory 622 to the processing unit 621. It should be noted however, that as mobile phones become more sophisticated, mobile phones are beginning to incorporate many of the components illustrated for conventional computer 620. Accordingly, with relatively minor adjustments, mostly with respect to input/output devices, the description of conventional computer 620 applies equally to mobile phones. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, motion detectors or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649*a* and 649*b*. Remote computers 649*a* and 649*b* may each be another personal computer, a server, a router, a network PC, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 can be connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An inventory control system, the inventory control system comprising:
   a cabinet, wherein the cabinet:
      is configured to store a physical item;
      is in electronic communication with a terminal; and
      dispenses the physical item in response to a sale; and
   the terminal, wherein the terminal:
      includes a computer system, the computer system comprising:
         one or more hardware processors;
         system memory coupled to the one or more hardware processors, the system memory storing instructions that are executable by the one or more hardware processors;
         the one or more hardware processors executing the instructions stored in the system memory to manage inventory of the one or more physical items stored in the electronic cabinet, including the following:
            allow an employee to enter the sale of the physical item;
            confirm the identity of the employee;
            receive an electronic communication from the cabinet, the signal indicative of the cabinet dispensing the physical item in response to the sale; and
            update an inventory of the cabinet in response to the signal.

2. The system of claim 1, wherein the cabinet includes a display configured to indicate inventory within the cabinet.

3. The system of claim 1, wherein the cabinet includes a keypad configured to control one or more functions of the cabinet.

4. The system of claim 3, wherein the keypad is configured to allow a user to enter a code to complete a transaction.

5. The system of claim 4, wherein the code includes at least one of:
   an employee identification number;
   a transaction identification number; or
   a sale identification number.

6. The system of claim 1, wherein the terminal is configured to identify at least one of:
   the physical item in the transaction;
   a position of the physical item in the cabinet;
   a PLU;
   a terminal identification number; or
   an employee identification number.

7. The system of claim 1, wherein the terminal includes a card reader.

8. The system of claim 1, wherein the physical item includes at least one of:
   a bottle;
   a can;
   a food; or
   a toiletry.

9. The system of claim 1, wherein confirm the identity of the employee includes the employee entering a pin number.

10. The system of claim 1, wherein confirm the identity of the employee includes automatic identification of the employee.

11. An inventory control system, the inventory control system comprising:
    an electronic cabinet, wherein the electronic cabinet:
       is configured to physically store one or more dispensable items for purchase, wherein the dispensable item includes at least one of:
          a bottle; or
          a can;
       is in electronic communication with a terminal; and
       dispenses the dispensable item in response to a sale;
    the terminal, wherein the terminal:
       includes a computer system, the computer system comprising:
          one or more hardware processors;
          system memory coupled to the one or more hardware processors, the system memory storing instructions that are executable by the one or more hardware processors;
          the one or more hardware processors executing the instructions stored in the system memory to manage inventory of the one or more dispensable items stored in the electronic cabinet, including the following:
             allow an employee to enter the sale of the dispensable item; and
             confirm the identity of the employee;
             receive an electronic communication from the electronic cabinet, the signal indicative of the electronic cabinet dispensing the dispensable item in response to the sale;
    a point of sale sever server:
       includes a computer system, the computer system comprising:
          one or more hardware processors;
          system memory coupled to the one or more hardware processors, the system memory storing instructions that are executable by the one or more hardware processors;
          the one or more hardware processors executing the instructions stored in the system memory to manage inventory of the one or more dispensable items stored in the electronic cabinet, including the following:

electronically communicate with the terminal and the electronic cabinet; and receive an electronic communication from the terminal, the signal indicative of the terminal completing a sale of one of the dispensable items;

transmit a signal to the electronic cabinet to dispense the one of the dispensable items; and receive an electronic communication from the electronic cabinet, the signal indicative of the electronic cabinet dispensing the dispensable item in response to the sale;

attribute the purchase of the dispensable item to an employee; and manage the operation of the inventory control system including:

managing inventory within the electronic cabinet, wherein managing inventor within the electronic cabinet includes:

updating an inventory of the electronic cabinet in response to the signal.

12. The system of claim 11, wherein the point of sale server is configured to communicate with an outside payment service.

13. The system of claim 12, wherein the outside payment service includes a merchant services account.

14. The system of claim 11, wherein the point of sale server is configured to produce a report.

15. The system of claim 14, wherein the report includes at least one of:

total number of a particular dispensable item;
the total number of all dispensable items;
total number of a particular dispensable item within the electronic cabinet;
the total number of all dispensable items within the electronic cabinet;
the location of a dispensable item;
total sales;
rate of sale;
profitability of dispensable items;
sales by employee; or
sale by customer.

16. A method of controlling inventory using an inventory control system, the method comprising:

producing an inventory list which identifies dispensable items within the electronic cabinet, wherein the dispensable item includes at least one of:

a bottle; or
a can;

confirming an identity of an employee;
releasing a dispensable item from the electronic cabinet;
completing a sale of the dispensable item to the employee at the terminal;
updating the inventory list to reflect the sale of the dispensable item.

17. The system of claim 16 further comprising providing an alert in response to a predetermined condition.

18. The system of claim 17, wherein the predetermined condition includes the number of a dispensable item dropping below a threshold amount.

19. The system of claim 17, wherein the predetermined condition includes a loss in functionality in one or more elements of the inventory control system.

20. The system of claim 17, wherein the alert is sent to a user through at least one of:

email;
text message;
pop-up message;
audio signal; or
visual signal.

* * * * *